INVENTOR.
CHARLES C. GOULD
ERNEST G. ANGER
BY

United States Patent Office 2,911,580
Patented Nov. 3, 1959

2,911,580

MOTOR REGULATOR SYSTEMS

Charles C. Gould, Solon, Ohio, and Ernest G. Anger, Wauwatosa, Wis., assignors to Square D Company, Detroit, Mich., a corporation of Michigan Application February 19, 1957, Serial No. 641,145

9 Claims. (Cl. 318—327)

The present invention relates to motor regulator systems and more particularly to motor regulator systems in which armature regulation extends over the range of armature and field control.

In prior systems conventional means of measuring the actual performance level of the regulated quantity included means capable of measuring the quantity to be regulated producing a signal which bears a fixed relationship to the measurement and a feedback signal bearing a fixed proportion to the level of the regulated quantity. In the conventional circuit therefore, an adjustable reference voltage or speed potentiometer was compared directly to the feedback signal source, such as a tachometer, in the error sensing system to produce a regulated signal which is amplified to control the voltage across the armature. The conventional system was limited to armature voltage regulation and no provision could be made for regulation above rated armature voltage or base speeds when a decrease in field excitation for field control was desired.

The present invention, therefore, was directed to a regulator system providing armature voltage regulation over the complete range of field excitation as well as the armature voltage range. A system normally regulating to base speeds only, may be regulated by the present invention at higher than base speeds over the range of field excitation. In a modification of the above where some armature control is desired, this may be provided without the need of a speed potentiometer or means of adjusting the reference voltage in the reference circuit. In still another modification, the complete range of regulation over both armature and field has been provided by the use of a speed or reference potentiometer for an adjustable voltage reference. Armature regulation has been extended into the field range in accordance with one of the features of the invention by attenuating the feedback signal derived from the means measuring the output of the regulated quantity while decreasing the field excitation. It is an object, therefore, to provide a regulator system having one or more of the foregoing features and advantages.

Another object of the present invention is to extend armature regulation into the field control range of a motor regulator system.

A further object of the invention is to provide a motor regulator system in which regulation of the motor is increased to include the control range of field excitation.

Still another object is the provision of a regulator system adjustable over the complete range of armature voltages and field excitation.

A further object is to provide a regulating system for a motor regulating to armature voltage over the complete control range of field excitation.

A still further object is the provision of an armature regulator for a motor regulating over the range of both armature voltages and field excitation.

Further objects and features of the invention will be readily apparent to those skilled in the art from the specification and appended drawing illustrating certain preferred embodiments in which.

Figure 1:
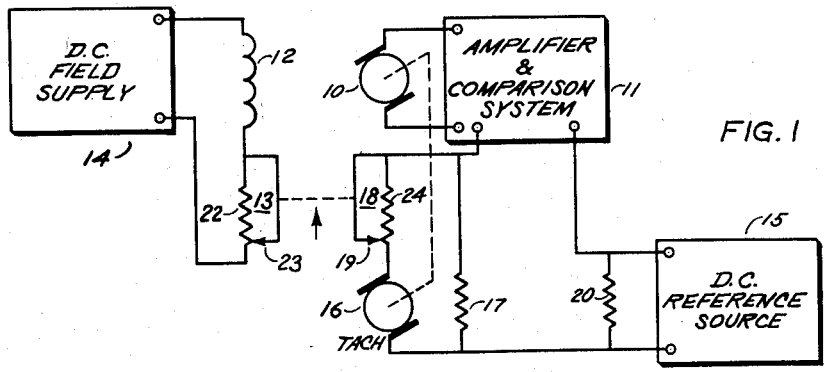
Fig. 1 is a circuit diagram, shown partly in block diagram, of the motor regulator system of the present invention.

Referring now to the drawings wherein like reference characters designate like or corresponding parts throughout the several views, there is shown in Fig. 1 a motor regulating system for a motor having an armature winding 10 connected to an armature voltage regulating circuit and a field winding 12 connected in series with the potentiometer or rheostat 13 to a D.C. field supply 14. The regulating system for the armature 10, regulating the speed of the motor or other regulated quantity includes the elements of the closed cycle control system which are shown as the amplifier and error sensing system comparing and amplifying the difference between the feedback signal and the D.C. reference signal source 15.

A tachometer generator 16 has been shown for measuring the actual performance level of the regulated quantity, in this instance, simply the speed of the motor to produce a feedback signal bearing a relationship to the speed measurement. A load resistor 17 is connected across the series circuit including the tachometer generator 16 and potentiometer 18 having an adjustable tap 19; as shown, the tachometer 16 is mechanically coupled to the rotor or motor armature. The adjustable taps 19 and 23 of potentiometers 13 and 18 in the field and tachometer circuits may be mechanically or otherwise coupled by a common operator or the like to provide simultaneous adjustment of the resistance elements 22, 24 included in the respective circuits. The D.C. reference source 15 should preferably be stable and carefully regulated not to fluctuate with line voltage, load or temperature changes to preselect the performance level required of the regulated quantity as developed across the resistor 20.

In the operation of Fig. 1, the regulated system will adjust to rated or base speed in a conventional manner wherein the feedback signal will measure the regulated quantity to be compared with the reference wherein the system will adjust and regulate to the reference at base speed.

The invention as illustrated in Fig. 1 however, is more particularly directed to the regulation of the motor above its normal speed range or rated base speed. In order to obtain regulation at higher than rated base speed, the field excitation is decreased while simultaneously decreasing the feedback signal to the comparison circuit wherein the operator in changing the field is also changing the feedback in the same direction when operating above the base speed of the regulating system.

The resistor element 22 of the potentiometer 13 is normally non-linear to match the motor field characteristic including the motor saturation characteristic; while the resistor element of the potentiometer in the feedback circuit may be linear. Adjustment of the potentiometer 13 in the field circuit with simultaneous adjustment of the feedback circuit potentiometer 18 adjusts the field excitation and the magnitude or the amplitude of the feedback signal. To illustrate this, assume the operator wishes to adjust the motor above base speed: the potentiometer taps or sliders 23 and 19 would be moved up substantially simultaneously by a common operator or the like to include a portion of the resistor elements 22 and 24 of the potentiometers 13 and 18 in their respective field and feedback circuits whereby the voltage drop across the potentiometer element 22 decreases the field excitation causing the rotor or armature 10 of the motor to increase in speed. The increase in speed increases the output of the tachometer generator 16; but the inclusion of a portion of the resistor element 24 in series with the tachometer generator 16 in the feedback circuit compensates for the increase in tachometer output and the resulting feedback signal corresponds to the voltage of the reference source 15 and the armature regulator system continues to regulate to the higher speed in the same manner as it regulates to motor base speed. Effectively, the circuit extends armature regulation into the field control range by adding a field potentiometer or rheostat 13 coupled to a similar potentiometer or rheostat 18 in the feedback circuit. The addition of these elements in a conventional regulating system and calibrating them permits the regulation to be extended beyond the normal speed range for higher motor speeds.

Figure 2:
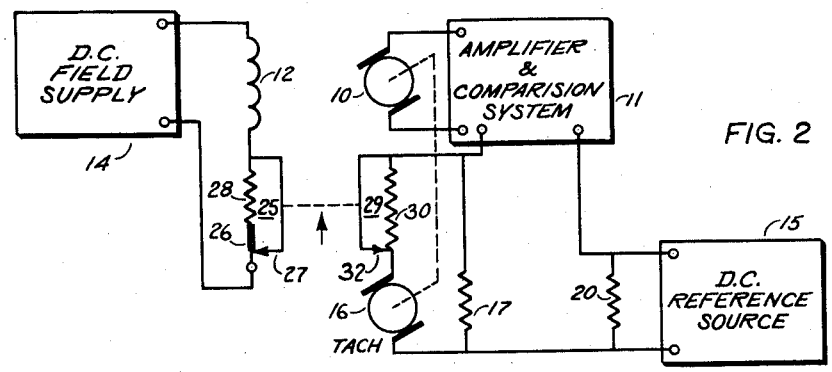
Fig. 2 is a circuit diagram also shown partly in block diagram illustrating a modification of the motor regulator system of Fig. 1.

The arrangement of Fig. 2 is similar to Fig. 1 with the exception that the potentiometer or rheostat 25 in the field circuit includes a bar or non-resistive portion 26 of the potentiometer element to permit a change in armature voltage and feedback attenuation without a change in field excitation and the operation provides some armature control before adjustment of speed by changing the field excitation. Fig. 2 therefore, includes a potentiometer 25 in the field circuit in which the resistance element includes a bar portion 26 on which the slidable tap is movable before engaging or including a portion of the resistance 28, while the potentiometer 29 in the feedback circuit includes a portion of the resistance 30 in the feedback circuit immediately upon movement of the movable taps 27 and 32 coupled by a common operator for simultaneous operation.

In the operation of Fig. 2 therefore, movement of the operator and movable taps 27 and 32 in the direction indicated by the arrow attenuates the feedback signal before decreasing field excitation causing the regulator system to increase the voltage across the rotor or armature 10 with rated field excitation or before field weakening or control. Adjustment of the tap 27 of the potentiometer 25 in the field circuit along with the potentiometer tap 32 in the feedback circuit controls the field excitation and the regulating system is operating above base speed with a weakened field but with armature regulation. Restated, the armature is built up to rated voltage at base speed when the potentiometer taps 27 and 32 are jointly moved upwardly along the potentiometer elements until the potentiometer tap 27 in the field circuit reaches the resistive portion 28 of its element entering the field control range with armature voltage regulation. Proper selection of a reference voltage will permit an unattenuated feedback signal to regulate the armature at a predetermined voltage below rated armature voltage.

Figure 3:
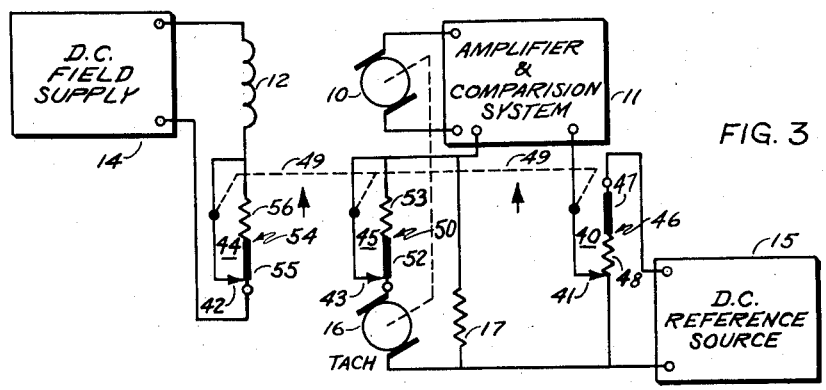
Fig. 3 is a modification of the motor regulator systems of either Figs. 1 or 2, in which the system has been shown schematically, partially in block diagram.

Fig. 3 is directed to a modification of either Figs. 1 or 2 in which the reference voltage includes a potentiometer or reference potentiometer 40 having a slider 41 coupled by a common operator 49 to the adjustable taps or sliders 42 and 43 of the field and feedback circuit potentiometers 44 and 45 for simultaneous adjustment in the same direction.

The reference potentiometer element 46 includes an upper bar portion 47 having no resistance and a lower resistive portion 48; potentiometer 45 in the feedback circuit includes an element 50 having a lower bar portion 52 having no resistance and an upper resistive portion 53; and the field circuit potentiometer 44 has an element 54 with a lower bar portion 55 and an upper resistive portion 56. All of the potentiometers may be 50% bar or non-resistive portion and 50% resistor portion wherein the reference potentiometer 40 is inverted.

In the operation of Fig. 3, as the common operator 49 for the three adjustable potentiometer taps 41–43 is adjusted upwardly, the reference voltage increases and the regulator adjusts accordingly to increase the voltage across the motor armature increasing the tachometer output and feedback signal to diminish the error, regulating to the new reference voltage setting. Armature control is thereby provided in the reference potentiometer range until the reference potentiometer tap 41 reaches the upper bar portion 47 of its potentiometer element 46. The adjustable tap 43 of the feedback potentiometer 45 normally reaches its upper resistive portion at the same time the reference potentiometer tap 41 reaches its upper bar portion and rated armature voltage is applied to the motor. The feedback signal is not attenuated and the field excitation is not decreased while the reference voltage is adjusted in the preferred operation of Fig. 3. However, armature control may be provided in the feedback circuit by diminishing the feedback signal before the motor reaches base speed at rated armature voltage wherein the reference signal range would have insufficient amplitude to operate the motor at rated armature voltage.

As shown in Fig. 3, the lower bar portion 55 of the field potentiometer element 54 and bar portion 52 of feedback potentiometer element 45 are equal in length to place armature control exclusively in the reference potentiometer circuit. Positioning the operator 49 to place the adjustable tap 42 of the field potentiometer 44 to include a portion of its resistor 56 decreases the field excitation and since the feedback potentiometer tap 43 is coupled to the field potentiometer tap 42 a portion of the resistor 53 of the feedback potentiometer 45 is included to attenuate the feedback signal as is more fully described in the operation of Fig. 1. When either the feedback potentiometer 45 or the field circuit potentiometer 44 includes a portion of its respective resistor 53, 56 of the elements 50 and 54, the reference potentiometer tap 41 is on the bar portion 47 of its potentiometer element 46 and the reference signal voltage remains constant during the changes in field excitation and feedback signal.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a regulating circuit for controlling a motor having separate armature and field circuits, the combination comprising; a source for energizing the field circuit, a reference voltage source, means for supplying a feedback voltage signal proportional to the speed of the motor, means connected in a series circuit with the reference source and feedback signal means for comparing and regulating the voltage of the armature in response to the voltages of the reference source and feedback signal, a variable impedance in the field circuit, a variable impedance in the series circuit including the feedback signal means, and means for simultaneously adjusting the impedances in both circuits to control the excitation of the field and to proportionately attenuate the signal in the feedback circuit.

2. In an adjustable speed regulating system arranged for separately regulating the energization of the field and armature circuits of an electric motor, the combination comprising; a separate source for energizing the field circuit, a reference voltage signal source, a feedback source in a series circuit with the reference signal source and having means arranged for producing a feedback signal proportional to the speed of the motor, means connected in the series circuit and connected in the armature circuit for comparing the difference between the reference voltage and feedback signals for regulating the energization of the armature circuit in response to said difference, a variable impedance in the series circuit including the feedback source, a variable impedance in the field circuit of the motor, and means for simultaneously adjusting the impedances of both circuits and attenuating the feedback circuit a predetermined amount in proportion to the decrease in excitation of the field circuit for extending the armature regulation of the motor into the field circuit range.

3. In a regulating system for a motor having separately energized field and armature circuits, the combination comprising; a reference voltage signal source, a feedback signal source connected in series circuit with the reference voltage source and having means for producing a signal proportional to the output of the motor, means connected in the series circuit and responsive to the difference between the feedback source signal and reference voltage signal for regulating the energization of the armature circuit in proportion to the difference in the signals, a variable impedance in the field circuit, and means including a variable impedance in said feedback series circuit for attenuating the feedback signal in proportion to an increase in impedance in the field circuit for extending the armature regulation of the system into the field control range.

4. In a regulating system for a motor having separately excited field and armature circuits, a reference voltage source, a feedback signal source connected in series circuit with the reference voltage source and having means for producing a voltage signal proportional to the speed of the motor, means connected in the series circuit and responsive to the voltage signal of both of said sources for regulating the energization of the armature circuit, means for varying the energization of the field and means coupled to the means for varying the energization of the field and connected in the series circuit for attenuating the voltage signal from the feedback signal source in proportion to a decrease in energization of the field for extending the armature regulation of the motor into the field control range.

5. The combination as set forth in claim 1 wherein the impedance in the field circuit is non linear and the impedance in the feedback circuit is linear.

6. The combination as recited in claim 1 wherein the voltage reference signal source is connected in circuit with a means having a variable impedance portion and a non variable impedance portion and the impedance in the field and feedback circuits each have variable and non variable impedance portions and wherein a common operator is arranged to actuate said means so the impedance in the reference signal source circuit is varied while the impedance in the feedback and field circuits remains substantially constant.

7. The combination as recited in claim 1 wherein the impedance means in the field circuit includes a variable and a non variable impedance portion and the impedance in the feedback circuit includes only a variable portion.

8. In a regulating system for controlling the speed of a motor having individually energized field and armature circuits which system includes; a D.C. reference signal source, a feedback voltage signal source having an output proportional to the speed of the motor, a means connected in series circuit with the reference source and feedback signal source and responsive to the voltage of the feedback voltage signal and arranged for sensing, comparing and amplifying the voltage difference between the feedback signal and reference voltage signal for regulating the energization of the armature circuit in response to the voltage difference of said signals, a means including a variable resistance in the field circuit for decreasing the energization of the field circuit and including a variable resistance in the series circuit for simultaneously attenuating the feedback signal in proportion to the decrease in energization of the field whereby the regulation of the energization of the armature circuit occurs during periods when the energization of the field is decreased.

9. The combination as recited in claim 1 wherein the reference voltage source is adjustable for regulating the speed of the motor.

References Cited in the file of this patent

UNITED STATES PATENTS

| | | |
|---|---|---|
| 1,376,452 | Meyer | May 3, 1921 |
| 2,235,551 | Garman | Mar. 18, 1941 |
| 2,295,395 | Formhals | Sept. 8, 1942 |
| 2,629,846 | Montgomery et al. | Feb. 24, 1953 |
| 2,830,249 | Peterson | Apr. 8, 1958 |